United States Patent [19]

Dunlop et al.

(10) Patent No.: US 6,721,872 B1
(45) Date of Patent: Apr. 13, 2004

(54) RECONFIGURABLE NETWORK INTERFACE ARCHITECTURE

(75) Inventors: Alfred Earl Dunlop, New Providence, NJ (US); Asawaree Kalavade, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/484,720

(22) Filed: Jan. 18, 2000

Related U.S. Application Data

(60) Provisional application No. 60/161,308, filed on Oct. 25, 1999.

(51) Int. Cl.[7] .................. G06F 15/177; G06F 15/16; G06F 13/42
(52) U.S. Cl. ..................... 712/28; 712/29; 709/230; 709/221
(58) Field of Search ............. 712/28, 29, 25; 709/221, 228, 230, 231, 400, 248; 370/445; 439/61

(56) References Cited

U.S. PATENT DOCUMENTS 6,072,803 A * 6/2000 Allmond et al. ............ 370/445
6,105,068 A * 8/2000 Naudus ....................... 709/228
6,129,557 A * 10/2000 Blaszczyk et al. ............. 439/61

OTHER PUBLICATIONS

3Com, Internet advertisement page for Meganertz 10MbpsLAN+56K Modem PC Card 3CXEM556BT (1999).

* cited by examiner

Primary Examiner—Daniel H. Pan

(57) ABSTRACT

A network interface architecture includes a processor having an associated program memory, and a programmable logic device coupled to the processor. A connection port of the logic device is adapted to be coupled to a medium of a selected network having a defined network protocol, and the logic device has an associated configuration memory. A data communication path is coupled to the processor and the logic device, and is arranged to connect with a host device for transferring data between the host device and a network to which the logic device is coupled. The processor responds to information identifying a selected network by loading corresponding network protocol data from the configuration memory and the program memory into the logic device and the processor. The host device may include, without limitation, a personal, lap top, desk top or hand-held computer, a network appliance, file server, printer, vending machine, cell phone or the like.

19 Claims, 10 Drawing Sheets

RECONFIGURABLE NETWORK INTERFACE ARCHITECTURE

CROSS REFERENCE TO RELATED APPLICATION

Provisional Application No. 60/161,308 filed Oct. 25, 1999, entitled "A Multi-Protocol Network Interface Card Based On A Reconfigurable Hardware-Software Architecture".

BACKGROUND OF THE INVENTION

1. Field of the Invention

This invention relates to an architecture for an interface between a host device such as a personal computer, and a communication or information network.

2. Discussion of the Known Art

Network interface cards (NICs) are known which allow a laptop, portable or desktop personal computer to connect with a particular wired or wireless communication network for which a given card is dedicated. For example, if a number of host computers are to be linked with one another over a wired local area network (LAN) in a building using "Ethernet" operating protocols, an Ethernet NIC must be connected to complete a data path between the network and each of the host computers. According to Ethernet protocols, data is transmitted in frames of between 46 and 1500 bytes in size, wherein each frame has six fields, namely; preamble, destination address (DA), source address (SA), type, data, and frame-check sequence (FCS).

Further, Ethernet uses broadcast technology wherein all host devices on the network will "hear" a transmission from any one of the host devices. If two or more devices transmit data simultaneously, collisions of their data are detected and the devices must re-transmit their data after random waiting periods.

If the host computers are to operate over a "token ring" network, a different NIC which is configured according to token ring network protocols must be acquired for connection between the network and the computers. In a token ring network, certain signal frames have nine fields, namely; start delimiter (SD), access control (AC), frame control (FC), destination address (DA), source address (SA), information (I), frame-check sequence (FCS), end delimiter (ED), and frame status (FS) fields. Also, a host device cannot transmit data into the network until it captures a "token" frame, and changes a token bit in the access control or AC field.

Thus, a data packet in a token ring network has a substantially different frame format from that of packets in Ethernet networks; A dedicated Ethernet NIC will not operate on token ring frames to implement a token ring interface for a host device, and vice versa. And, if the host computers are to link with the Internet, a separate modem card is typically provided in addition to any NIC(s) installed in each computer for communication over LANs.

Emerging network technologies such as, e.g., asymmetric digital subscriber line or DSL may also require special interfaces to allow a host device to access wire lines of a network provider. Moreover, in a "WaveLAN" network, a number of host computers are interconnected via wireless links currently assigned at 902 MHz, 2.4 GHz, or 5.7 GHz. Wireless LANs also require host devices to have interfaces adapted to meet special signaling protocols, in addition to a physical medium interface including a UHF or microwave transceiver and antenna.

A so-called "combo card" is offered by 3Com Corporation (No. 3CXEM556BT) which features both 10 Mbps Ethernet LAN and 56 kbps modem capabilities. These functions are performed using separate, dedicated hardware and software on the card, however. Also, future Ethernet or modem up-grades could be difficult, if not impossible, to implement on such a card.

Accordingly, as demand for access to various communication and information networks increases, there is a need for one interface architecture that will allow host devices and other networks nodes to select one of a number of different network protocols for communication with one another.

SUMMARY OF THE INVENTION

According to the invention, a reconfigurable network interface architecture includes a processor having an associated program memory. A programmable logic device is coupled to the processor, and has a connection port arranged to be coupled to a medium of a network having a defined network protocol. The logic device has an associated configuration memory, and the program memory and the configuration memory are arranged to store network protocol data corresponding to one or more network protocols. A data communication path is coupled to the processor and to the logic device, and the communication path is arranged to be coupled to a host device for transferring data between the host device and a network to which the logic device is coupled. In response to information identifying a selected network, the processor is arranged to load corresponding network protocol data from the configuration memory and the processor memory into the logic device and the processor, so that the host device can communicate with other devices over the selected network.

For a better understanding of the invention, reference is made to the following description taken in conjunction with the accompanying drawing and the appended claims.

DETAILED DESCRIPTION OF THE INVENTION

Figure 1:
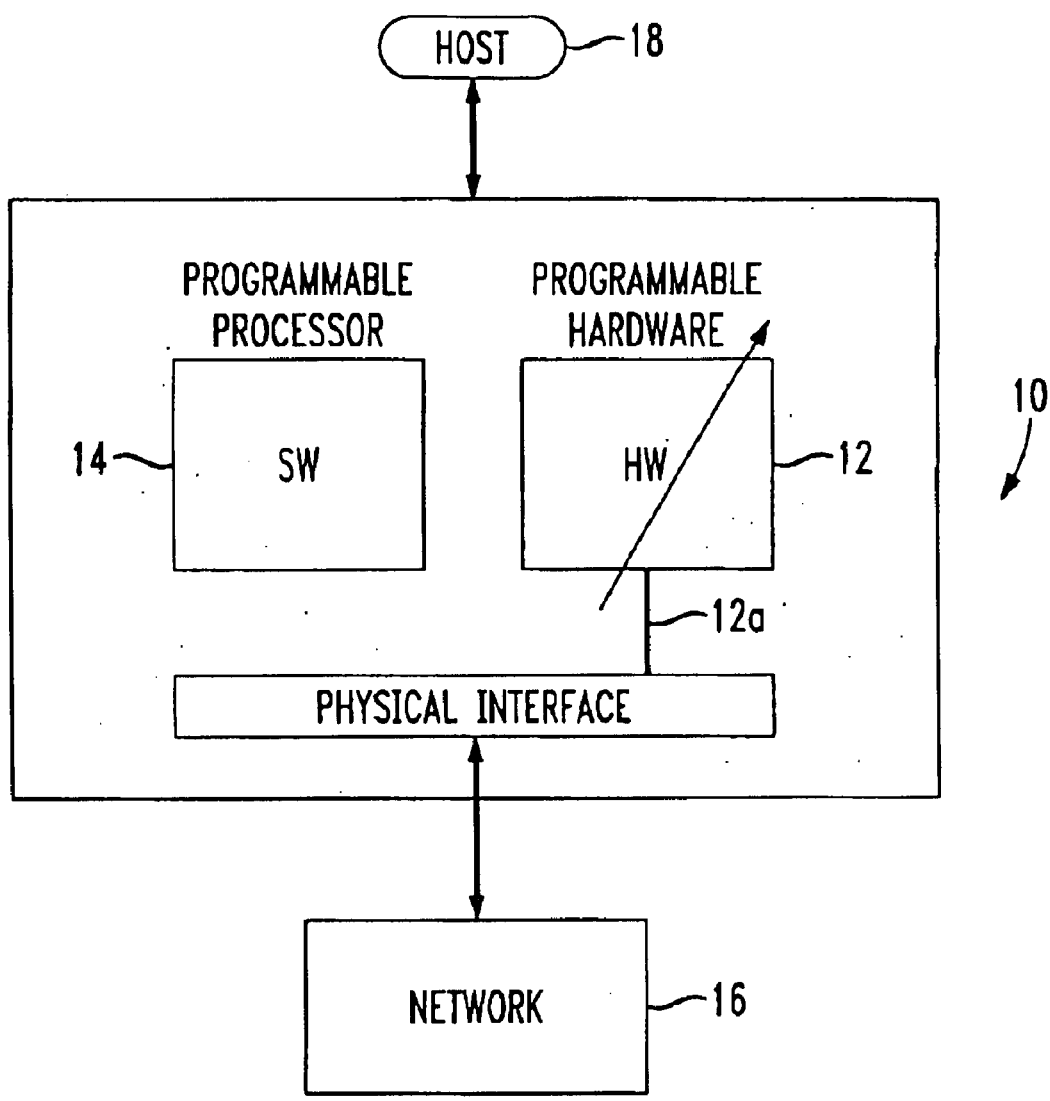
FIG. 1 shows a reconfigurable hardware-software architecture for a network interface according to the invention.

FIG. 1 is a representation of a reconfigurable network interface architecture 10 according to the invention. Basically, the architecture 10 combines a programmable hardware (HW) device in the form of, for example, a programmable logic device (PLD) such as a field programmable gate array (FPGA) 12, and a programmable software (SW) device in the form of a processor 14; to support multiple network operating protocols between a chosen network 16 and a host device 18. The host device may be any kind of host including but not limited to a personal laptop, desktop or hand-held computer, a network appliance, file server, printer, vending machine, cell phone or the like. An example of currently popular hand-held computers in which the architecture 10 can be embodied are so-called personal digital assistants (PDAs) such as "Palm Pilot" devices. The host device may also be a server or other node at a central site or base station of a given network. A typical device for the FPGA 12 may be Xilinx type "4044 XLA". A typical device for the processor 14 may be StrongARM type "SA1100".

The architecture 10 may be implemented on a circuit board having dimensions and pin terminal connections similar to existing network interface cards including, but not limited to, PCMCIA, PCI or ISA bus type cards. It is also contemplated that the architecture 10 will incorporate such terminal connections as will enable it to be plugged onto or otherwise operatively connect with any current, emerging (e.g., "Handspring") or future type of bus of a host device. The architecture 10 permits the FPGA 12 and the processor 14 to cooperate with one another in such a manner as to allow the host device 18 to communicate with other nodes or devices on the network 16 according to a currently active network signaling protocol.

Figure 2:
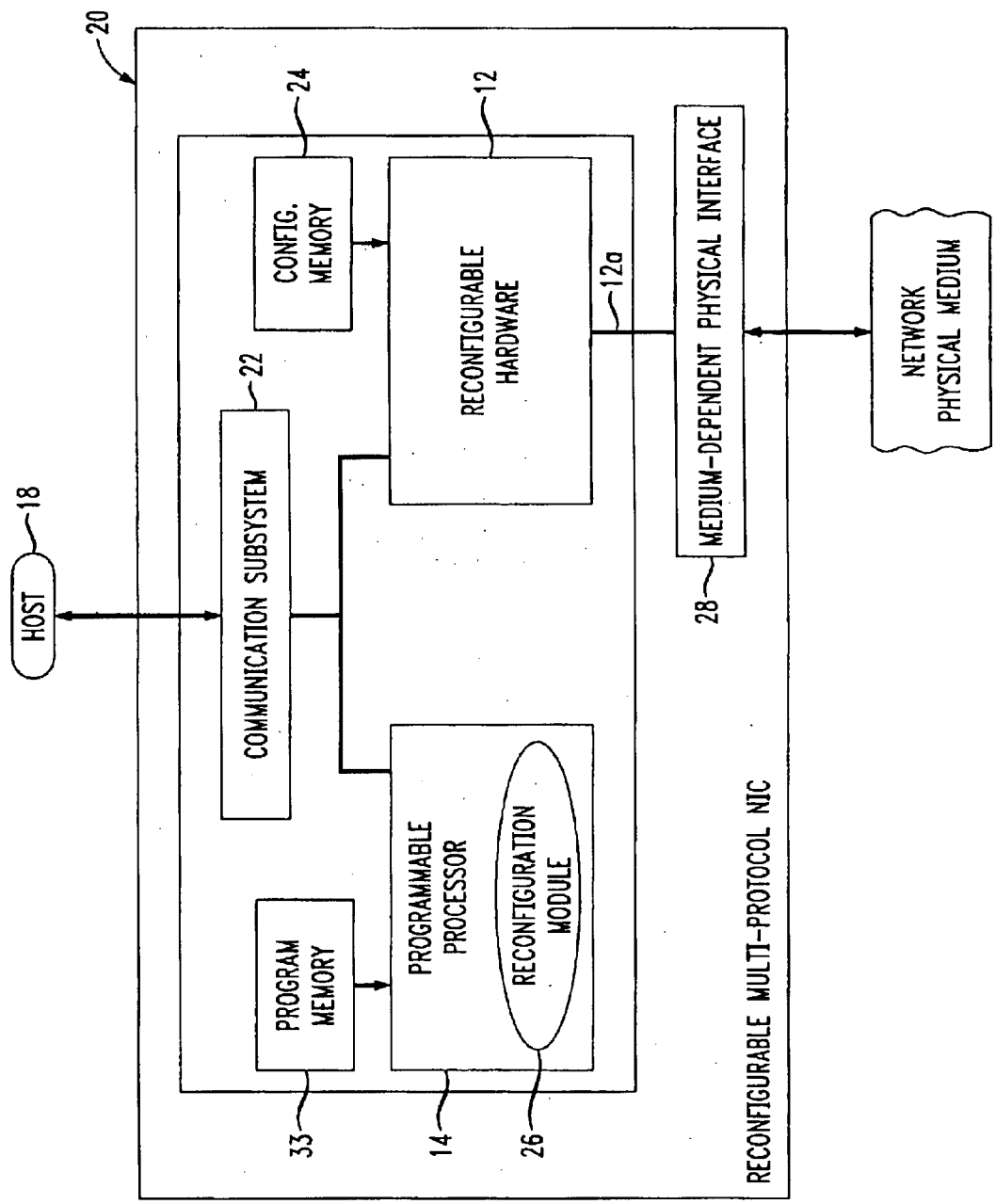
FIG. 2 is a functional block diagram of a multi-protocol, reconfigurable network interface card (NIC) using the architecture of FIG. 1.

FIG. 2 is a functional block diagram of a multi-protocol reconfigurable network interface card or NIC 20, incorporating the architecture 10 of FIG. 1. A communication subsystem 22 operatively connects the FPGA 12 and the processor 14 to one another, and with the host device 18 and the physical medium of the network 16. Communication subsystem 22 may be configured to eliminate communication bottlenecks among data transfers between components, of the card 20, as explained below.

The FPGA 12 has an associated configuration memory 24. The processor 14 has an associated program memory 33, and. a reconfiguration module 26 is implemented by software in the processor as explained below. The configuration memory 24 is arranged to store certain data associated with protocols of networks to which a connection port 12a of the FPGA 12 is adapted to be coupled. Such data may pertain to signaling format and size of data frames to be transmitted and received by the host device 18 over the network 16, error checking algorithms to be performed on data carried by the network, and other digital logic processes to be performed on the network data. Thus, using the architecture 10 of FIG. 1, the NIC 20 is capable of implementing digital parts of layer 1 of the known seven-layer OSI network model, as well as layer 2 and higher layers of the protocol stack. The reconfiguration module 26 of the processor is arranged to respond to data or other information identifying a desired network protocol implementation for the NIC 20, by signaling the configuration memory 24 and the program memory 33 to load corresponding program data into the FPGA 12 and the processor 14.

A medium dependent physical interface 28 associated with the card 20 serves to couple the FPGA connection port 12a operatively with the chosen network. For example, the physical interface 28 may comprise a radio transceiver and antenna in the case of a wireless LAN. For wired LANs, the physical interface 28 may include one or more network connectors or connection cables adapted to mate with a connector that terminates the physical medium 16 of the network, for example; a type RJ45 jack for unshielded twisted pair (UTP), a type BNC jack for coaxial cable, or a jack connector for a fiber optic network. Because terminating connectors used by various communication and information networks vary, the NIC 20 can be provided with one or more sets of transition components or connectors, as well as connecting cables, to allow the connection port 12a to connect mechanically and electrically with the chosen network 16. The configuration memory 24 may also be arranged to provide such data as may be necessary for configuring the FPGA connection port 12a to match the physical interface 28.

Figure 3:
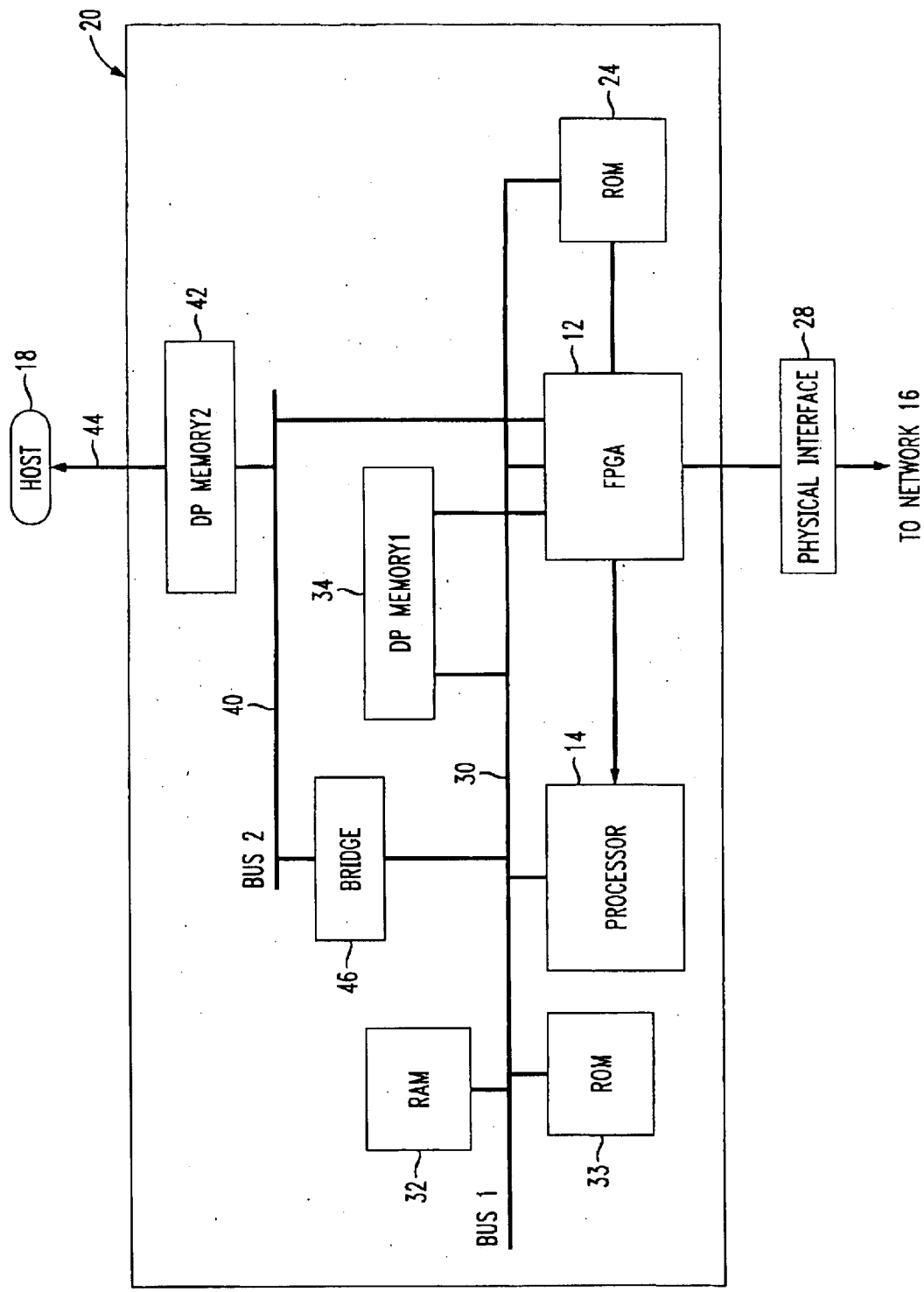
FIG. 3 is a schematic block diagram showing typical components and their connections in the NIC of FIG. 2.

FIG. 3 is a schematic block diagram showing typical components and connecting busses forming the NIC 20 of FIG. 2. Without limitation, a two-bus architecture is illustrated and described in detail below.

A first bus 30 interconnects the gate array 12 and its associated configuration memory 24, the processor 14 and its associated program memory 33, a working or random access memory (RAM) 32 associated with the processor 14, and a first dual port (DP) memory 34. The first bus 30 serves as a local bus for the processor 14 and the gate array 12, both of which may communicate directly with one another over the first bus 30 through a memory-mapped mechanism typically useful for short data transfers. The processor 14 and the gate array 12 may also communicate with one another through their shared DP memory 34. The gate array 12 can be configured to interrupt the processor 14 directly.

The NIC 20 also has a second bus 40. The bus 40 connects the processor 14 and the gate array 12 with the host device 18, through a second DP memory 42. A bus 44 of the host device 18 connects with one port of the second DP memory 42 when the NIC 20 is inserted in a card slot or otherwise operatively connected to the host device 18. A second port of the DP memory 42 is connected to the second bus 40, and is shared by the processor 14 and the gate array 12. In the FIG. 3 embodiment, the second bus 40 connects directly to a port of the gate array 12, and a bridge 46 is connected between the first bus 30 and the second bus 40 to enable data to be transferred between the processor 14 and the shared port of the DP memory 42. The bridge 46 is configured to isolate local data exchanged between the gate array 12 and the processor 14 on the first bus 30, from exchanges of host data that may be present on the second bus 40.

Figure 8:
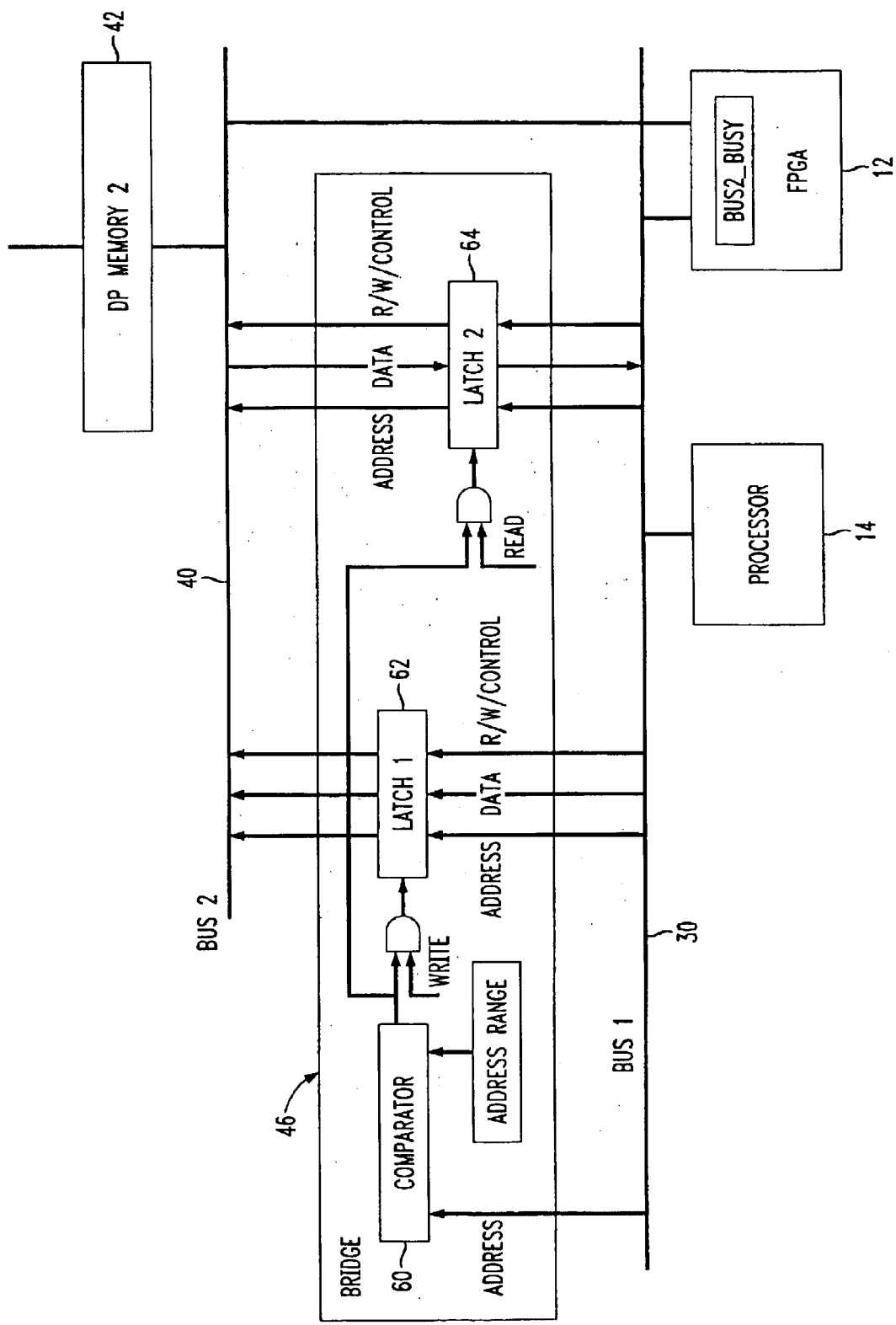
FIG. 8 is a schematic block diagram of a bridge component of the NIC in FIG. 3.
Figure 9:
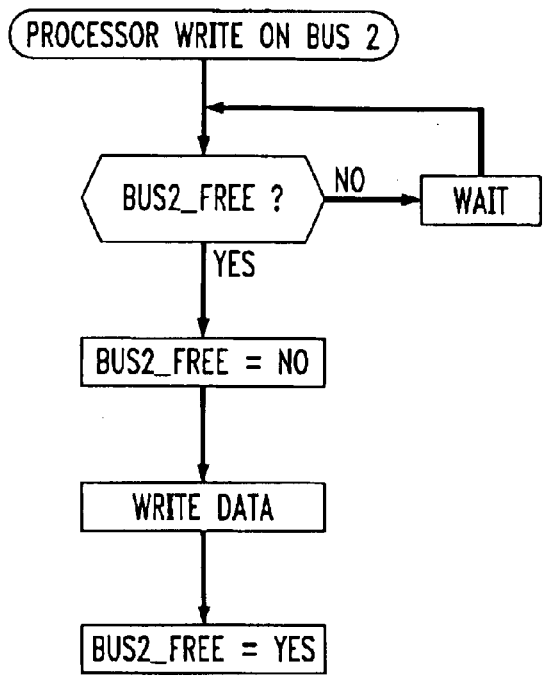
FIGS. 9–12 are flow diagrams illustrating a semaphore flag operation in the bridge of FIG. 8.
Figure 10:
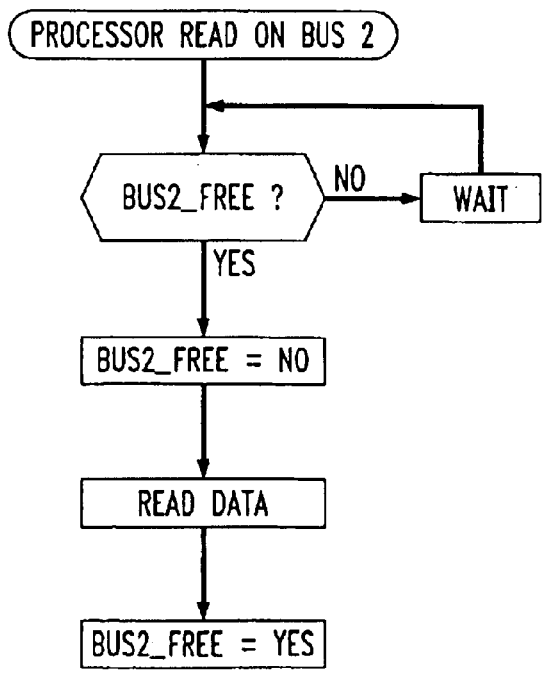
Figure 11:
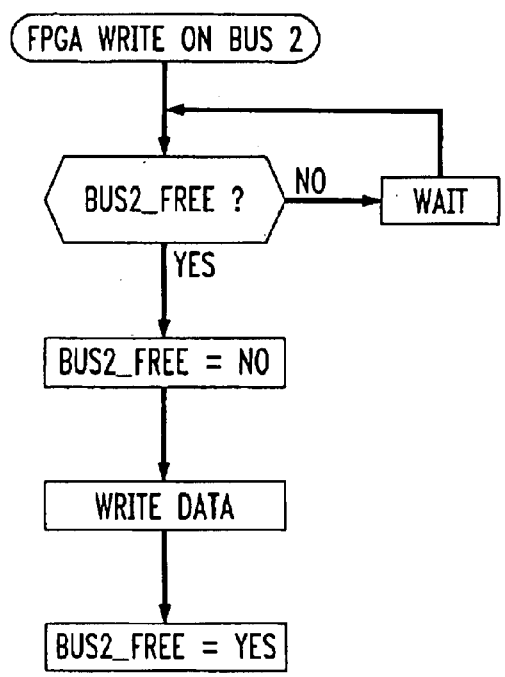
Figure 12:
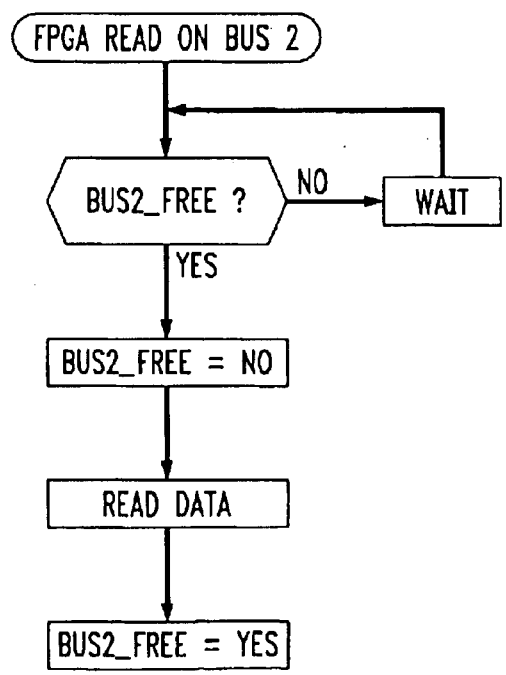

As seen in FIG. 8, bridge 46 operates to pass address and working data, and read/write requests between the first and the second busses 30, 40, for a specified address range depending on a defined system memory map. For example, locations 0x1000–0x2000 may be defined as an address range for the processor 14 to access the second bus 40 (i.e., all addresses in this range are mapped to DP memory 42). Bridge 46 monitors all address transfers on the first bus 30, and, if an address is in the defined range, it passes associated transactions onto the second bus 40. Otherwise, the transaction is ignored.

Specifically, the bridge 46 monitors each address on bus 30 and compares it to the specified range. If an address falls in the range, a comparator 60 generates an active signal. Depending on whether the transaction is a read or a write request, a corresponding one of two latches 62, 64, is enabled and corresponding data is transferred. If a read request is present, data from the DP memory 42 is transferred to the first bus 30 by enabling the latch 64. If a write transaction is present, data from the first bus 30 is transferred to the second bus 40 and, hence, to DP memory 42 by enabling the latch 62.

Since the processor 14 and the FPGA 12 share one port of the DP memory 42 through bus 40, access to bus 40 must be arbitrated. That is, the processor 14 and the FPGA 12 cannot access bus 40 simultaneously. This may be accomplished by a semaphore mechanism, as represented in FIGS. 9–12.

A "semaphore" or flag is maintained in the FPGA 12. Both the processor 14 and the FPGA 12 set or reset this flag. The second bus 40 is accessed by either of the FPGA 12 or the processor 14 only if the flag is "free" (Bus2_Free=YES) as shown in each of FIGS. 9–12.

When the processor 14 wishes to write to DP memory 42, it first checks the flag Bus2_Free. If the flag is free (indicating that bus 40 is not being accessed), the processor 14 sets the flag to "NO" and sends data. After the transaction, the processor 14 resets the flag. Meanwhile, if the FPGA 12 needs to access bus 40, the FPGA will see the flag set at NO. FPGA 12 waits until the flag is reset to YES before it conducts its transaction. Similarly, when processor 14 wishes to read from DP memory 42, it checks the flag before initiating a read request. And, the FPGA 12 also checks the flag before initiating any read/write request from the DP memory 42. While in the illustrated embodiment the semaphore is maintained in the FPGA 12, it may if desired be contained in the processor 14, the bridge 46, or other outside circuit.

Figure 4:
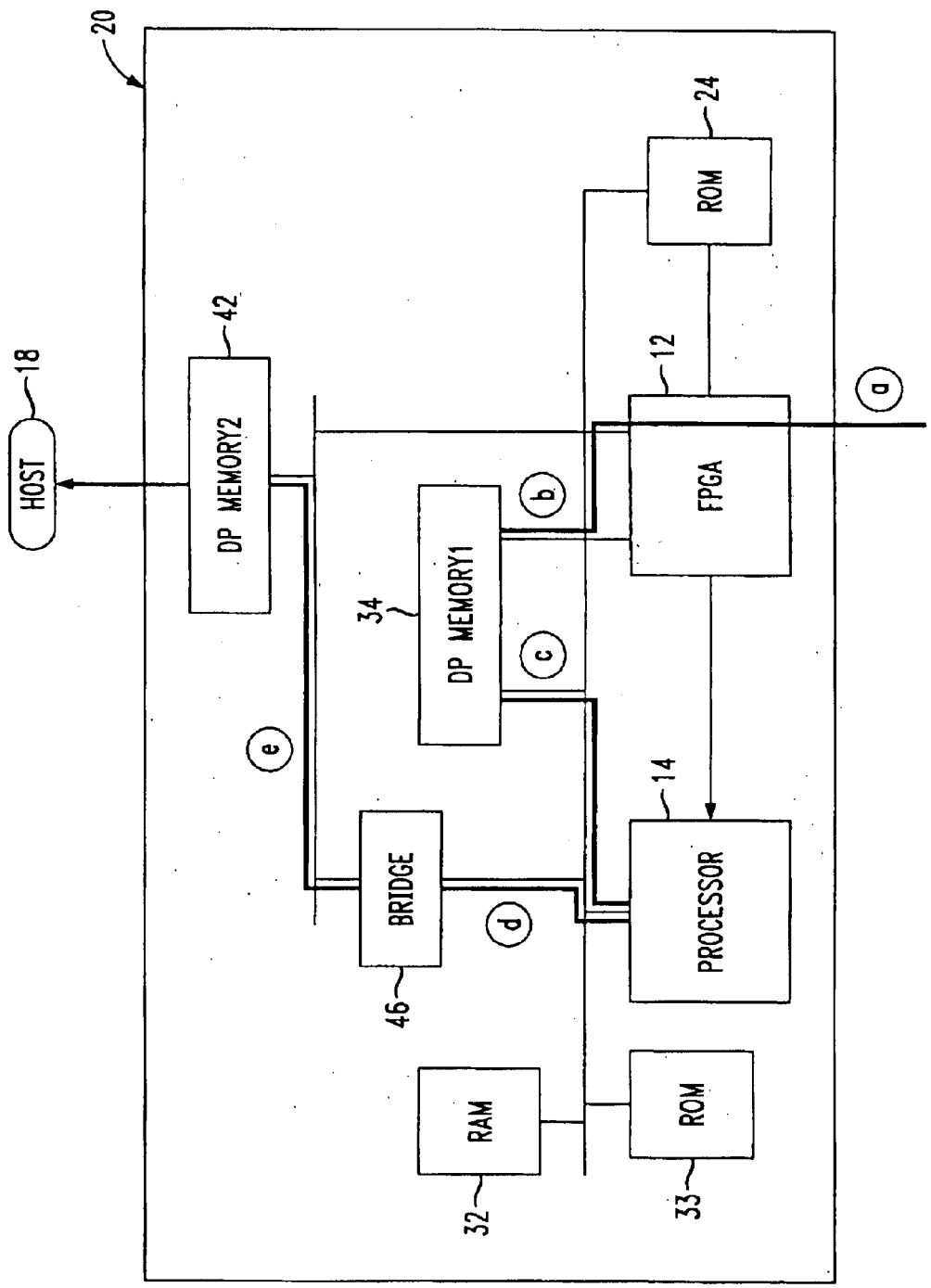
FIG. 4 is a schematic block diagram similar to FIG. 3, illustrating a first path of data transfer between a host device and a network through the NIC of FIG. 3.

FIG. 4 is a block diagram similar to FIG. 3, illustrating a data communication path among the processor 14, the gate array 12, the network 16, and the host device 18. In FIG. 4, data is exchanged between the network 16 and the host device 18 via the gate array 12, the first DP memory 34, the processor 14, the bridge 46, and the second DP memory 42. FIG. 4 shows an operating condition for the NIC 20 wherein incoming data packets from the network 16 are processed (e.g., filtered) by the FPGA 12 (see path a), and are sent to the processor 14 through the first DP memory 34 (see path b) for further processing such as, for example, error checking. The processor 14 receives the packets from memory 34 (see path c), and processes them accordingly. Processor 14 sends the processed packets to the host device 18, for example, through the bridge 46 (see path d), over the second bus 40 (path e) and into the second DP memory 42. A reverse process may be used for transmission of data packets from the host device 18 into the network 16.

Figure 5:
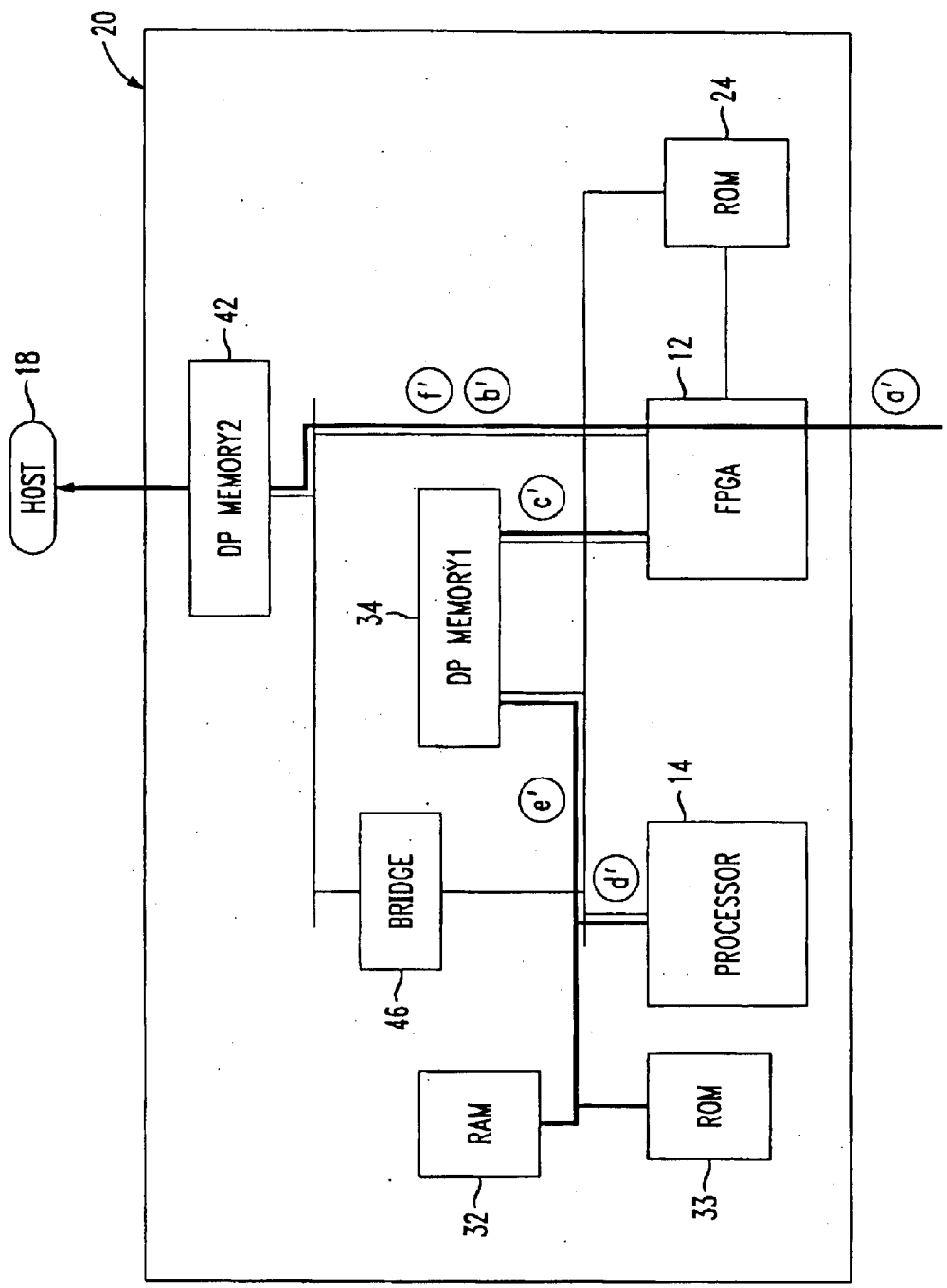
FIG. 5 is a schematic block diagram similar to FIG. 3, illustrating a second path of data transfer between a host device and a network through the NIC of FIG. 3.

FIG. 5 is a block diagram similar to FIG. 3, illustrating an exchange of data between the network 16 and the host device 18, directly through the gate array 12 and the second DP memory 42. FIG. 5 shows an operating condition for the NIC 20 wherein incoming data packets from the network 16 are received by the FPGA 12 and filtered (path a'). Some of the packets may be sent directly to a host device 18 through the second DP memory 42 (path b'), while other packets may pass through the first DP memory 34 to the processor 14 for processing (path c').

Packets received by the processor 14 (path d') are processed and returned to the FPGA 12 through the first DP memory 34 (path e'). The FPGA 12 then sends the processed packets to the host device 18 through the second DP memory 42 (path f'). A reverse process may be used on transmission of data packets from the host device 18 into the network 16.

As mentioned above, the reconfiguration module 26 of the processor 12 is arranged to initiate a reconfiguration process by which the card 20 will support a network protocol different from a current protocol configuration of the card. The reconfiguration process may be triggered upon either of two events, viz., (1) a change of the physical network interface (i.e., connector), or (2) network protocol binding changes initiated through the host device 18.

Figure 6:
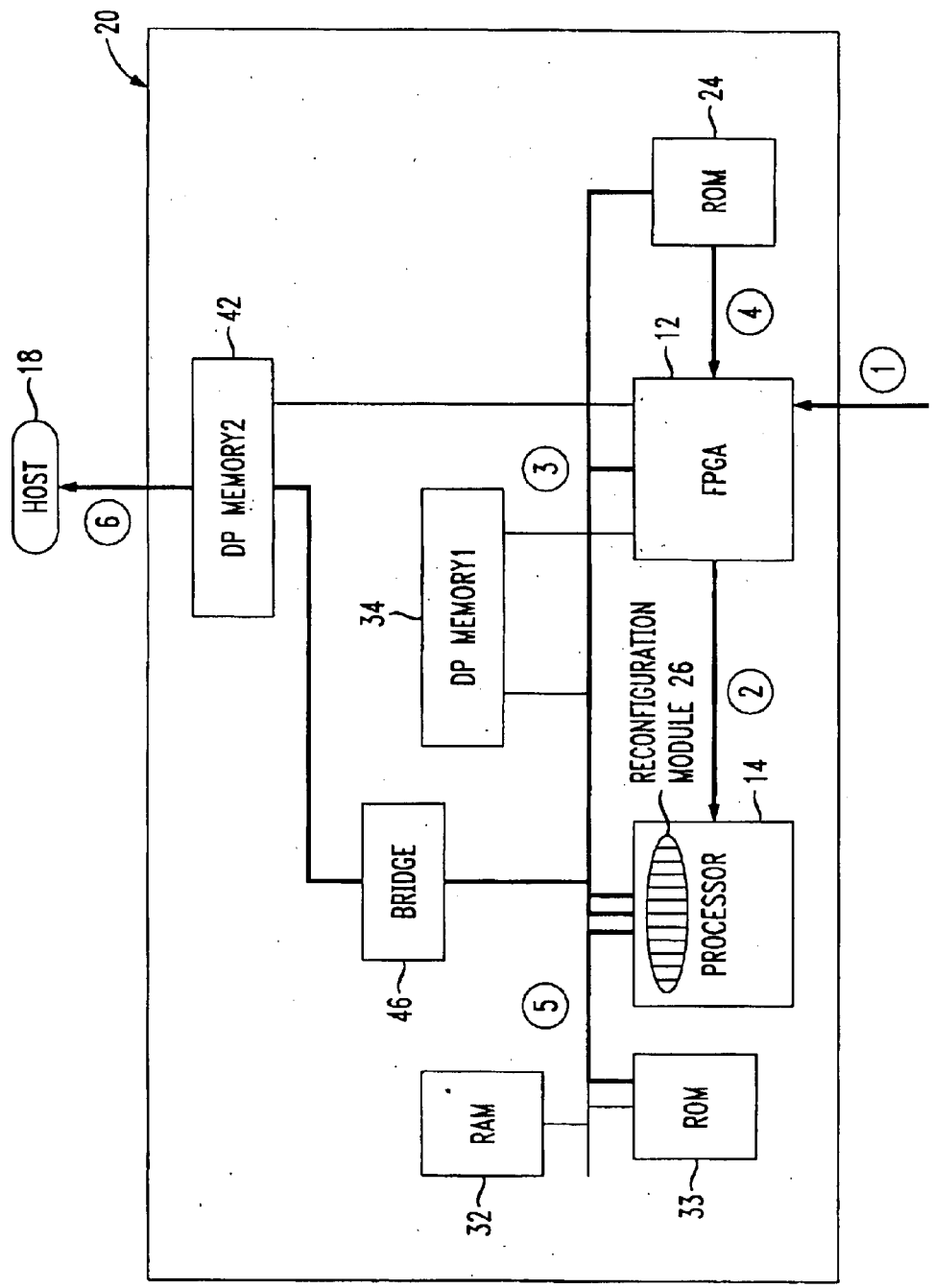
FIG. 6 is a schematic block diagram similar to FIG. 3, illustrating a first data path for a dynamic configuration of the NIC according to an identified protocol of a chosen network.

FIG. 6 illustrates the reconfiguration process when triggered upon event (1) above, i.e., connection of a different network cable or connector at the medium-dependent physical interface 28. A switch mechanism, or other conventional means is provided for identifying (either by manual user operation or passively) a network protocol which is to be implemented by the card 20 for operation over the chosen network 16. In response to data or information conveyed by such means (see path 1), the gate array 12 interrupts the processor 14 and informs the reconfiguration module 26 of a change in the physical network interface (path 2). The reconfiguration module then identifies a set of protocol data stored in the configuration memory 24 that corresponds to the identified protocol. Module 26 sets the FPGA 12 into a configured state by generating addresses (path 3) for the configuration memory 24 corresponding to the identified set of stored protocol data (path 4).

The reconfiguration module 26 also signals the program memory 33 to load a program corresponding to the new network protocol into the processor 14 (path 5). The processor then informs the host device 18 that the reconfiguration process is complete (path 6). It is contemplated that the entire reconfiguration process can be performed in only 10's of milliseconds. Configuration data needed for the gate array 12 is typically only about 150 Kbits for each network protocol, so data corresponding to several different protocols can be stored in the memory 24.

Figure 7:
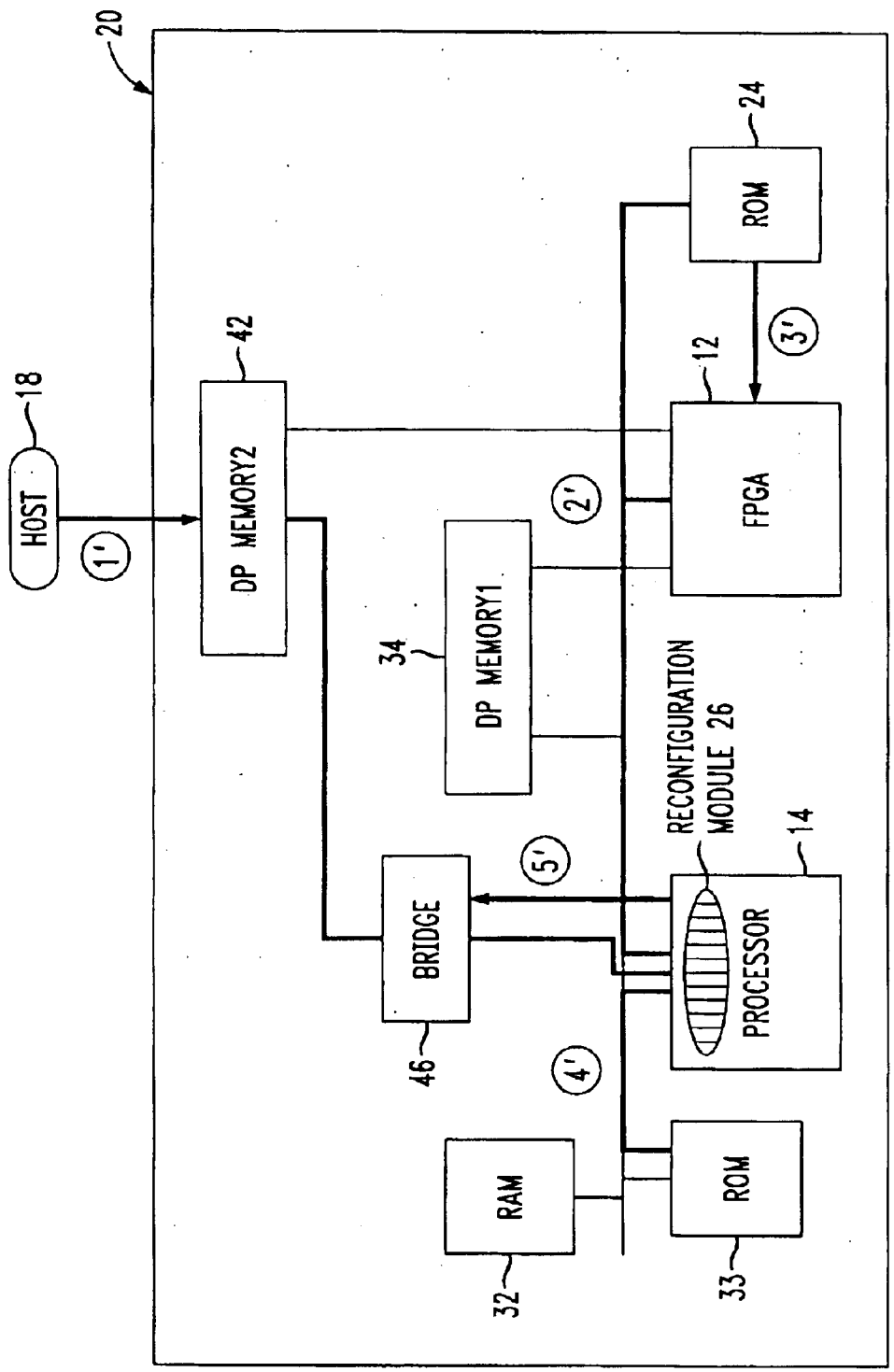
FIG. 7 is a schematic block diagram similar to FIG. 3, illustrating a second data path for a dynamic configuration of the NIC according to an identified protocol of a chosen network.

FIG. 7 illustrates an alternative reconfiguration process, corresponding to event (2) above. That is, a user or a higher level application on the host device 18 inputs information to change network protocol bindings (path 1'). The host device 18 first informs the reconfiguration module 26 of the binding change, through the bridge 46. The module 26 then signals the configuration memory 24 and the program memory 33 as in the process of FIG. 6 (paths 2' and 3'). The host device 18 is then informed by processor 14 when the process is complete (path 5').

Data corresponding to existing network protocols may be loaded into the configuration memory 24 at the time of manufacture of the card 20, and new network protocols may be loaded afterward by way of upgrades (e.g., via the Internet) if, for example, the configuration memory 24 and the program memory 33 are in the form of "flash" or other kind of non-volatile memories. Once a new protocol configuration is downloaded to the host device 18, the host device may later inform the reconfiguration module 26 of the new protocol and transmit the downloaded configuration data to the processor 14. The reconfiguration module 26 can read this data, and load the configuration memory 24 and the program memory 33 accordingly. When a user or higher level application on the host device 18 desires to implement the new protocol, either process described above in connection with FIGS. 6 and 7 may then be initiated.

When the NIC 20 is operatively connected to a bus of the host device 18, the host device may be programmed with such driver software so that the host device recognizes the NIC 20 as a peripheral device, and allows a user of the host device to set certain operating parameters for the NIC 20 if desired. For example, the user or a higher level application on the host device may identify ascertain network operating protocol through operation of the host device, as described in connection with FIG. 7. The nature and use of such driver software for the host device 18 would be apparent to one skilled in the art.

EXAMPLE

A prototype NIC 20 was breadboarded using the earlier mentioned Strong ARM device for processor 14, and the mentioned Xilinx device for FPGA 12. The prototype card was configured to support two protocols, namely, (1) Ethernet at 10/100 Mbps, and (2) DSL running at 1.5 Mbps on receive, and at 512 Kbps on transmit. The reconfiguration module 26 of the processor was arranged to switch dynamically between the two protocols upon signaling of a change in the physical network interface. Reconfiguration time was measured at 100 milliseconds.

When in a 100 Mbps Ethernet configuration, the gate array 12 was configured to implement the functions of data frame assembly, cyclic redundancy check (CRC) coding, and conversion to a 4-bit serial interface when transmitting into the network 16. The gate array 12 was also configured to carry out a reverse process on data received from the network 16. The processor 14 was configured to cooperate with the gate array 12 and to act as a state machine.

When operating in the DSL mode, the gate array 12 was configured to operate both as a transmit and as a receive filter for data transmitted into and received from the network 16. The processor 14 was programmed to carry out requisite scrambling, encoding and mapping; and descrambling, decoding and demapping functions, when transferring data in corresponding directions between the NIC 20 and the host device 18.

As disclosed herein, the NIC 20 allows an end user or higher level application to connect a single host device dynamically with networks having different operating protocols and transmission media. Further, once assembled and tested, a manufacturer may pre-configure the NIC 20 to suit the requirements of particular customers using different networks worldwide. It is likely to be more cost effective to manufacture the NIC 20 with the capacity to select among two or more network protocols, than to produce and to inventory various styles of interface cards each with a different pair of dedicated protocol implementations.

Moreover, the programmable architecture of the NIC 20 eliminates the fabrication and test time (typically two to six months) otherwise needed for a new interface card with dedicated protocol implementations. And, most important, the NIC 20 affords the end user the convenience of a dynamically reconfigurable, multi-protocol network interface that can be embodied on a single connectable card for his or her host device.

As suggested earlier, the NIC 20 may also be used as a "line card" located at a central site or base station of a given network. In such a case, the NIC 20 would be configured according to the operating protocol of the network to which the site or station belongs. Further, although the FPGA 12 and the processor 14 are shown as separate components in the drawing, it will be understood that the FPGA and the processor may be embodied within a single integrated circuit device, together with other components of the NIC 20. Further, the host device may be combined with these components to create an entire system on a single chip.

While the foregoing description represents a preferred embodiment of the invention, it will be obvious to those skilled in the art that various modifications may be made, without departing from the spirit and scope of the invention pointed out by the following claims.

We claim:

1. A reconfigurable network interface comprising:

a processor for controlling operations of the interface, the processor comprising an associated program memory; and a programmable logic device comprising a connection port adapted to be connected to a current network, the logic device comprising an associated configuration memory, wherein the processor is further adapted to load a newly selected set of network protocol data different from a current set of protocol data into the logic device and the processor in response to trigger information identifying a new network and to reconfigure the interface in response to said trigger information so that a host device can communicate with other devices over the new network.

2. The network interface according to claim 1, further comprising a medium dependent physical interface associated with the connection port of the logic device for operatively connecting the connection port with a physical medium of a new network.

3. The network interface according to claim 2, wherein said trigger information is produced in response to a change of the medium dependent physical interface.

4. The network interface according to claim 2 wherein the medium dependent physical interface is adapted to mate with a connector associated with a twisted wire pair network.

5. The network interface according to claim 2, wherein the medium dependent physical interface is adapted to mate with a connector associated with a coaxial cable network.

6. The network interface according to claim 2, wherein the medium dependent physical interface is adapted to mate with a connector associated with a fiber optic network.

7. The network interface according to claim 2, wherein the medium dependent physical interface comprises a wireless transceiver.

8. The network interface according to claim 7, wherein the medium dependent physical interface comprises an antenna.

9. The network interface according to claim 2, wherein the medium dependent physical interface comprises an adapter cable.

10. The network interface according to claim 2, wherein the medium dependent physical interface comprises a transition connector.

11. The network interface according to claim 1, wherein said trigger information is produced in response to an operation of the host device.

12. The network interface according to claim 1, wherein the configuration and the program memories comprise non-volatile memories, and the processor is further adapted to transfer network protocol data from the host device for storage in said memories.

13. The network interface according to claim 1, wherein the configuration and the program memories comprise non-volatile memories, and the processor is further adapted to transfer network protocol data from a network to which the logic device is connected for storage in said memories.

14. The network interface according to claim 1, further comprising a data communications path adapted to connect the processor and logic device, the path comprising a first and second bus, and a bridge adapted to be connected between the first and the second busses, wherein the bridge is adapted to selectively transfer data between the first bus and the second bus.

15. The network interface according to claim 14, wherein the data communication path comprises a dual port memory having a first port adapted to be connected to the logic device and a second port connected to the first bus.

16. The network interface according to claim 14, wherein the data communication path comprises a dual port memory having a first port adapted to be connected to the second bus and a second port adapted to be connected to a bus of the host device.

17. The network interface according to claim 16, wherein the bridge comprises circuitry for producing a semaphore flag so that one of said logic device or said processor can access the second bus only when the flag indicates a free condition wherein the second bus is not being accessed by the other one of said logic device or said processor.

18. The network interface according to claim 1, wherein the interface comprises a plug-in card.

19. The network interface according to claim 18 wherein the card comprises terminals adapted for connection with card slot terminals in the host device.

* * * * *